United States Patent [19]

Thomsen

[11] 4,303,633

[45] Dec. 1, 1981

[54] METHOD OF RECOVERING ELEMENTAL SULFUR FROM REACTIVE GASES CONTAINING SULFUR DIOXIDE AND HYDROGEN SULFIDE

[75] Inventor: Adolf Thomsen, Bad Homburg, Fed. Rep. of Germany

[73] Assignee: Metallgesellschaft Aktiengesellschaft, Frankfurt am Main, Fed. Rep. of Germany

[21] Appl. No.: 810,756

[22] Filed: Jun. 28, 1977

Related U.S. Application Data

[63] Continuation of Ser. No. 648,015, Jan. 12, 1976, abandoned.

[30] Foreign Application Priority Data

Jan. 16, 1975 [DE] Fed. Rep. of Germany ....... 2501557

[51] Int. Cl.³ .............................................. C01B 17/04
[52] U.S. Cl. ................. 423/574 R; 423/576; 422/193
[58] Field of Search ......................... 423/573, 574, 576

[56] References Cited

U.S. PATENT DOCUMENTS

| | | | |
|---|---|---|---|
| 1,922,872 | 8/1933 | Thompson | 423/576 |
| 2,630,374 | 3/1953 | Miller | 423/576 |
| 2,630,375 | 3/1953 | Miller | 423/576 |
| 2,742,347 | 4/1956 | Carlson | 423/576 |
| 3,393,050 | 7/1968 | Hunt et al. | 423/574 |

Primary Examiner—G. O. Peters
Attorney, Agent, or Firm—Karl F. Ross

[57] ABSTRACT

Reactive gases containing sulfur dioxide and hydrogen sulfide, e.g. reaction gases of the CLAUS process, are passed through a catalyst stage having an inlet side and an outlet side for the gas mixture to produce elemental sulfur and water in accordance with the reaction $$2H_2S + SO_2 \rightarrow 3S + 2H_2O + Q$$

where Q is the heat liberated in this exothermic reaction. According to the invention the gases are cooled between the inlet and discharge sides by heat-exchanger means to a temperature not less than the activation temperature for the reaction and preferably not less than the temperature at which the gases are initially introduced into the catalyst body. The heat exchanger means can be provided in gaps between catalyst beds and/or within the catalyst beds of the body of catalyst.

1 Claim, 6 Drawing Figures

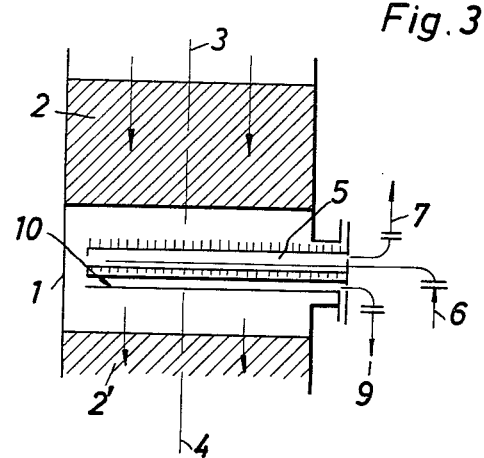
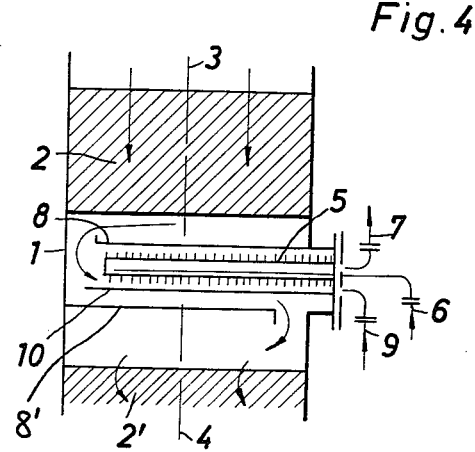

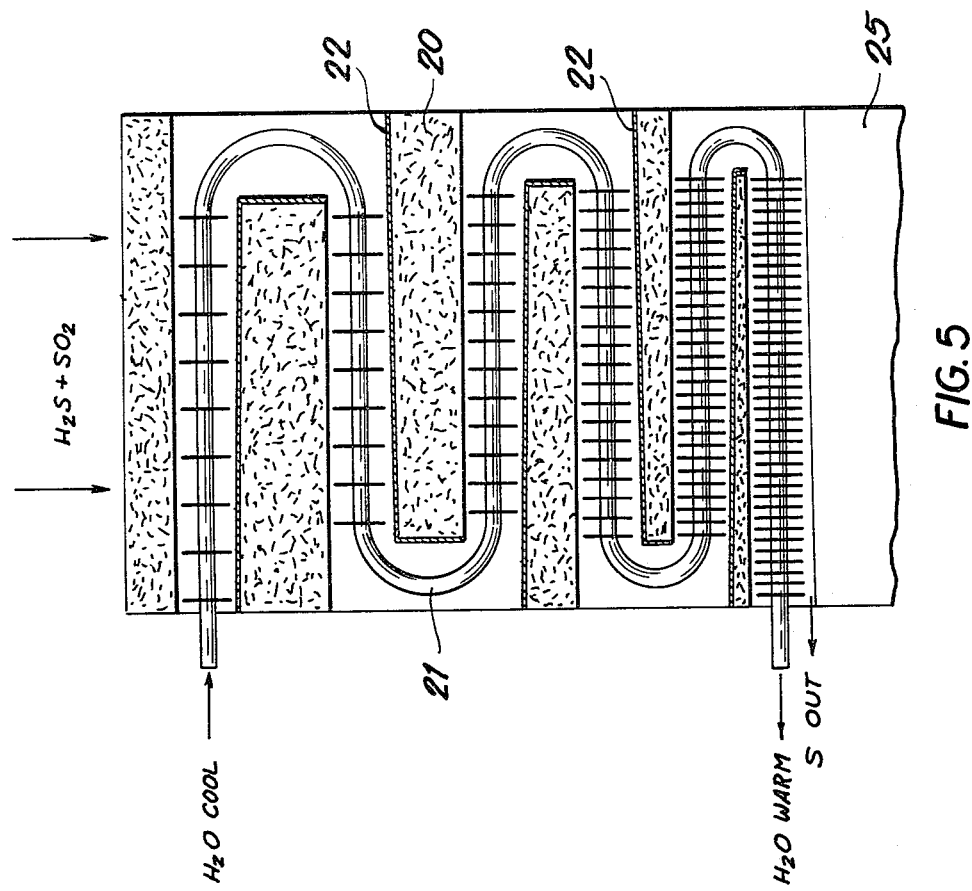

METHOD OF RECOVERING ELEMENTAL SULFUR FROM REACTIVE GASES CONTAINING SULFUR DIOXIDE AND HYDROGEN SULFIDE

This is a continuation of application Ser. No. 648,015, filed 12 Jan. 1976, now abandoned.

FIELD OF THE INVENTION

The present invention relates to a method of recovering elemental sulfur and especially recovering elemental sulfur from gases containing hydrogen sulfide and sulfur dioxide, such as the reaction gases of the CLAUS process, which are passed through a catalyst body.

BACKGROUND OF THE INVENTION

It has been proposed heretofore to convert the reaction gases of the CLAUS process which contain hydrogen sulfide ($H_2S$) and sulfur dioxide ($SO_2$) to elemental sulfur and water vapor in catalyst beds, thereby removing the two sulfur compounds and recovering sulfur in an elemental state which is a desirable product.

It is desired to obtain a high yield of high purity sulfur from such processes.

The reaction proceeds in accordance with the equation $$2H_2S + SO_2 \rightarrow 3S + 2H_2O + Q.$$

The products of the reaction, as can be seen from the equation, are elemental sulfur and water, Q being the liberated heat. Since such processes tend toward a state of equilibrium (i.e. the competing reaction in which elemental sulfur combines with water to produce hydrogen sulfide and sulfur acid becomes significant), the reaction is generally carried out in a plurality of stages.

Since the reaction is highly exothermic, as is indicated by the evolution of heat Q, the reaction gases must be cooled after they have traversed the catalyst body so that condensation of sulfur and, if desired, water, is brought about and the sulfur is recovered. However, in conventional systems this requirement is disadvantageous since the cooling is effected significantly below the desired reaction temperature and even below the activation temperature at which the elemental-sulfur-forming reaction will proceed. Consequently, the gases must be reheated between the catalyst stages, i.e. before the reaction gas is introduced into the next stage. Such sequences of catalytic reaction, cooling, reheating, catalytic reaction . . . are repeated several times to maximize the yield of elemental sulfur.

OBJECTS OF THE INVENTION

It is the principal object of the present invention to avoid the above-mentioned disadvantages and to improve upon the production of elemental sulfur from reactive gases passed through a catalyst bed.

SUMMARY OF THE INVENTION

The present invention achieves the foregoing objects by providing a method of converting the reaction gases to elemental sulfur in which the gases are caused to flow toward or past cooling surfaces disposed within the catalyst bed and/or between the catalyst beds in such a manner that only a partial quantity of the elemental sulfur is condensed, together with water if desired, and the gases are so cooled that they do not need to be reheated before they come into contact again with the catalyst.

According to the invention, therefore, the catalyst beds or bed is provided as a catalyst body having a gas-input side and a gas-discharge side, the catalyst body being formed with cooling surfaces within the body inbetween the input and discharge sides for cooling the gases at a temperature less than that at which all sulfur is condensed and to a final temperature at each cooling region which is yet above the activation temperature for the reaction and preferably is no less than the temperature at which the gases are initially brought into contact with the catalyst body.

The catalyst body may consist of a multiplicity of spaced-apart beds traversed in succession by the gases, the heat-exchanger means being located in the spaces between the beds. Alternatively, the body may be formed as a single catalyst bed having cooling means received therein or the cooling means may be provided both within the beds and between them.

It is crucial that the cooling should be carried out but to the extent necessary to remove only a portion of the elemental sulfur contained in the gases and preferably to the extent necessary to remove a minor fraction (i.e. less than 50%) of the elemental sulfur contained therein. However, in some cases it may be preferred at each cooling station to eliminate up to 75% of the condensable sulfur.

Preferably the cooling surfaces are held at a temperature about 100° to 150° C. below the gas temperature and the gases, upon contact with the cooling surfaces of the heat-exchanger means, are at superatmospheric pressure.

According to another aspect of the invention, the apparatus for carrying out the method of the invention comprises a catalyst column formed with a plurality of catalyst beds and having an inlet for the reaction gases at one end and an outlet for residual gas at the other. Cooling means, e.g. cooling coils and/or finned tubes, are disposed within the catalyst beds and/or between them and have inlets and outlets for circulating a cooling fluid, e.g. water or steam through the heat-exchanger means, and means for extracting condensed sulfur from each cooling unit. Preferably the latter means includes outlets extending from the column and communicating with a discharge trough.

The advantages afforded by the invention include elimination of interstage reheating of the gases without, however, adversely affecting the ultimate recovery of elemental sulfur. Considerable energy is thereby saved.

The incorporation of the cooling means in or inbetween the catalyst beds simplifies the recovery or separation of sulfur and considerable capital saving is obtained in the structure of the apparatus. Furthermore, in a reactor of a given size, additional catalyst and condensing space can be provided since the need for reheating space is eliminated.

BRIEF DESCRIPTION OF THE DRAWING

The above and other objects, features and advantages of the present invention will become more readily apparent from the following description, reference being made to the accompanying drawing in which:

FIGS. 3 and 4 are diagrams illustrating other cooling arrangements according to the invention;

FIG. 5 is a diagram of still another system embodying the invention; and

FIG. 6 is a graph of the temperature pattern in the latter system.

SPECIFIC DESCRIPTION

Figure 1:
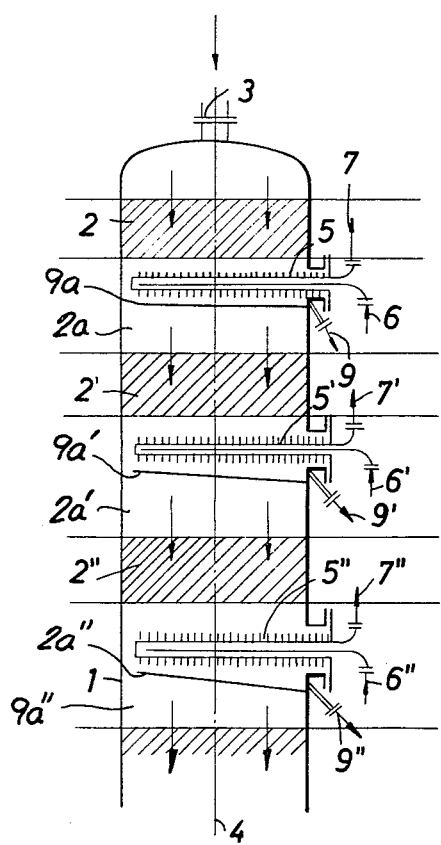
FIG. 1 is a diagrammatic vertical section through an apparatus for carrying out the invention.

In the drawing, the column 1 is provided with a plurality of spaced-apart beds 2, 2', 2" etc. of a porous catalyst capable of reacting the H₂S and SO₂ of a CLAUS gas to produce elemental sulfur in accordance with the reaction

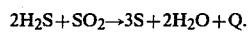

$$2H_2S + SO_2 \rightarrow 3S + 2H_2O + Q.$$

Between the beds 2, 2', 2" etc. there are provided spaces 2a, 2a', 2a" etc. in which cooling units 5, 5', 5" etc. are disposed.

An inlet 3 at the top of the reactor serves to deliver the CLAUS gas thereto while an outlet can be provided as generally represented at 4 at the exit end of the column for the residual gases.

The cooling means each comprise a trough 9a, 9a', 9a" having an outlet 9, 9', 9" etc. for the condensed sulfur and a finned-tube arrangement above the trough having an inlet 6, 6', 6" etc. for the coolant, which may be water or steam, and an outlet 7, 7', 7" etc. for this coolant.

The gases descend in the column successively through the beds with intervening cooling to condense part of the sulfur present in the gases.

Figure 2:
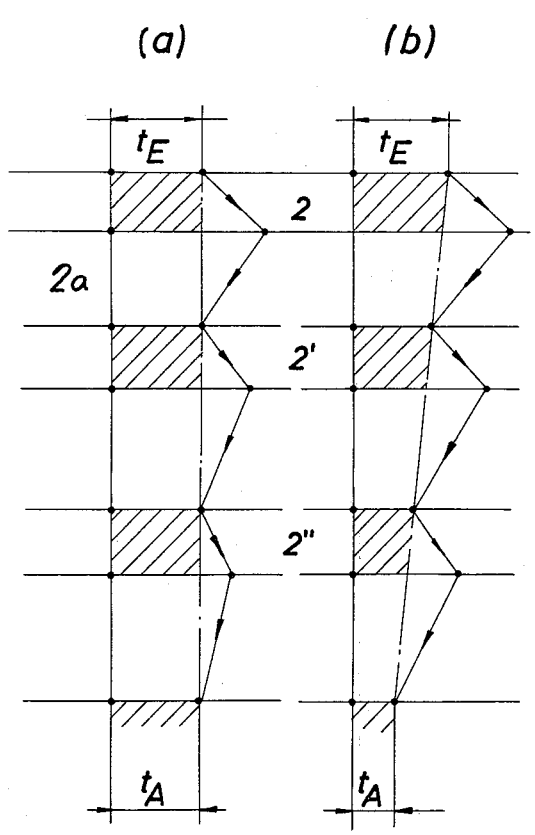
FIG. 2 is a graph illustrating two temperature patterns in the reactor.

In FIG. 2, graph (a) shows the temperature change through the initial bed 2, a temperature increase being represented by a slope to the right and a temperature decrease by a slope to the left. In each catalyst bed 2, 2', 2" the temperature rises, albeit at a decreasing rate as the hydrogen sulfide and sulfur dioxide are depleted. In each cooling stage 2a, 2a' etc. the gases are cooled to the inlet temperature $t_E$. Of course, in this case, the outlet temperature $t_A$ is the same as the inlet temperature.

Graph (b) of FIG. 2 shows a similar operation except that the outlet temperature $t_A$ is less than the inlet temperature $t_E$, both being above the activation temperature of the present action.

In the embodiment of FIG. 3, the trough 10 feeds the outlet 9 with the condensed sulfur, the gases freely flowing around the heat exchanger 5. However, in FIG. 4 a baffle plate 8 is provided above the heat exchanger 5 and another baffle plate 8' is provided below each heat exchanger to compel the gases to flow close along the heat-exchange surface.

In the embodiment of FIG. 5, the catalyst bed 20 is formed with a cooling coil 21 directly above the bed, the coil being paralleled by a trough 22 for collection of the liquid sulfur. The temperature pattern within the bed is shown in FIG. 6 and it will be apparent that only moderately high temperature increases are provided. To the extent that the gas may emerge into the space 25 below the bed 20 at a higher temperature than its inlet temperature $t_E$, the cooling arrangements of FIGS. 3 or 4 may be provided in these spaces as well.

I claim:

1. A method of recovering elemental sulfur from a reaction gas catalytically reactive to form elemental sulfur in a vapor state in an exothermic reaction, comprising the steps of:

(a) passing said gas at a temperature within the activation range of said reaction downwardly through a first horizontal bed of a catalyst body maintained at a temperature within the activation temperature range for said reaction from an input side of said body toward a discharge side thereof, thereby forming a hot gas containing elemental sulfur in vapor state, said gas having a subatmospheric pressure;

(b) partially condensing the sulfur in the vapor state of the hot gas of produced in step (a) and thereby partially condensing the sulfur from said gas by cooling said hot gas in contact with a cooling surface arranged within said body beneath said bed without cooling the bed thereabove, said cooling surface having a temperature about 100° to 150° C. below the temperature of the gas emerging from the bed thereabove but below the condensation temperature for sulfur and maintained by means of a cooling liquid flowing through a passage of which said surface forms a wall;

(c) collecting and discharging the condensed and liquefied sulfur and thereby separating it from said hot gas immediately upon condensation;

(d) passing the gas after the partial condensation of sulfur therefrom in step (b) into a further horizontal bed of said catalyst body located below the bed previously traversed by the gas and sustaining said exothermic reaction in said further bed to increase the sulfur-vapor content of the gas in the further bed;

(e) repeating steps (b) through (d) for each of a plurality of catalyst beds disposed below said first bed and below one another;

(f) discharging said gas after the last contact with a cooling surface at said discharge side of said body; and (g) maintaining the temperature of the gas in all said beds above that at which said catalytic reaction can proceed and above that at which elemental sulfur vapor is totally condensed from the reaction gases solely by the exothermicity of the reaction in each bed after the first bed.

* * * * *